(12) United States Patent
Johnson et al.

(10) Patent No.: US 10,502,593 B1
(45) Date of Patent: Dec. 10, 2019

(54) LINEAR AND ROTARY MULTITRACK ABSOLUTE POSITION ENCODER AND METHODS USING THE SAME

(71) Applicants: Philip M. Johnson, Durham, NH (US); David K. Johnson, Beverly, MA (US)

(72) Inventors: Philip M. Johnson, Durham, NH (US); David K. Johnson, Beverly, MA (US)

( * ) Notice: Subject to any disclaimer, the term of this patent is extended or adjusted under 35 U.S.C. 154(b) by 0 days.

(21) Appl. No.: 16/433,427

(22) Filed: Jun. 6, 2019

Related U.S. Application Data

(60) Provisional application No. 62/681,896, filed on Jun. 7, 2018.

(51) Int. Cl.
*G01D 5/347* (2006.01)

(52) U.S. Cl.
CPC ....... *G01D 5/34792* (2013.01); *G01D 5/3473* (2013.01); *G01D 5/34746* (2013.01)

(58) Field of Classification Search
CPC ............... G01D 5/347; G01D 5/34707; G01D 5/34715; G01D 5/3473; G01D 5/34746; G01D 5/34776; G01D 5/34792
See application file for complete search history.

(56) References Cited

U.S. PATENT DOCUMENTS

| | | | | |
|---|---|---|---|---|
| 2,632,058 A * | 3/1953 | Gray | ......... | H01J 31/04 375/242 |
| 3,799,675 A * | 3/1974 | Johnson | ......... | G01S 1/70 356/152.1 |
| 4,015,253 A * | 3/1977 | Goldstein | ......... | H03J 5/0272 341/9 |
| 4,846,577 A * | 7/1989 | Grindon | ......... | G01B 11/2536 356/610 |
| 5,371,608 A * | 12/1994 | Muto | ......... | H04N 1/047 358/412 |
| 5,410,399 A * | 4/1995 | Johnson | ......... | F41G 7/263 244/3.13 |
| 6,379,632 B1 * | 4/2002 | Kinoshita | ......... | A61L 2/18 134/170 |
| 6,700,645 B1 * | 3/2004 | Shigematsu | ......... | G03F 7/2002 355/53 |
| 7,366,425 B2 * | 4/2008 | Mamyshev | ......... | H04B 10/505 398/188 |
| 8,586,287 B2 * | 11/2013 | Tonchev | ......... | G03F 1/60 264/1.1 |
| 9,479,757 B2 * | 10/2016 | Michel | ......... | G02B 5/04 |
| 2003/0175036 A1 * | 9/2003 | Mamyshev | ......... | H04B 10/505 398/188 |
| 2013/0052592 A1 * | 2/2013 | Tonchev | ......... | G03F 1/60 430/320 |
| 2014/0320605 A1 * | 10/2014 | Johnson | ......... | G01B 11/2513 348/47 |

(Continued)

*Primary Examiner* — John R Lee
(74) *Attorney, Agent, or Firm* — Grossman Tucker Perreault & Pfleger PLLC

(57) ABSTRACT

Optical Position Encoders and methods using the same are described. In embodiments, the optical position encoders include a multitrack Hybrid Cyclic Binary Code-2 (HCBC-2) encoded scale and an Optical Readout Assembly (ORA), where the ORA provides absolute position optical readout and automatic physical alignment to the scale. Linear optical position encoders, rotary optical position encoders, and methods of measuring the position of ORA relative to a scale using such encoders are also described.

21 Claims, 11 Drawing Sheets

(56) References Cited

U.S. PATENT DOCUMENTS

| | | | | |
|---|---|---|---|---|
| 2015/0301468 A1* | 10/2015 | Adachi | ............. | G03G 15/0142 |
| | | | | 399/301 |
| 2016/0173855 A1* | 6/2016 | Michel | .................... | G02B 5/04 |
| | | | | 348/46 |
| 2018/0080766 A1* | 3/2018 | Johnson | ................. | G01S 17/02 |

* cited by examiner

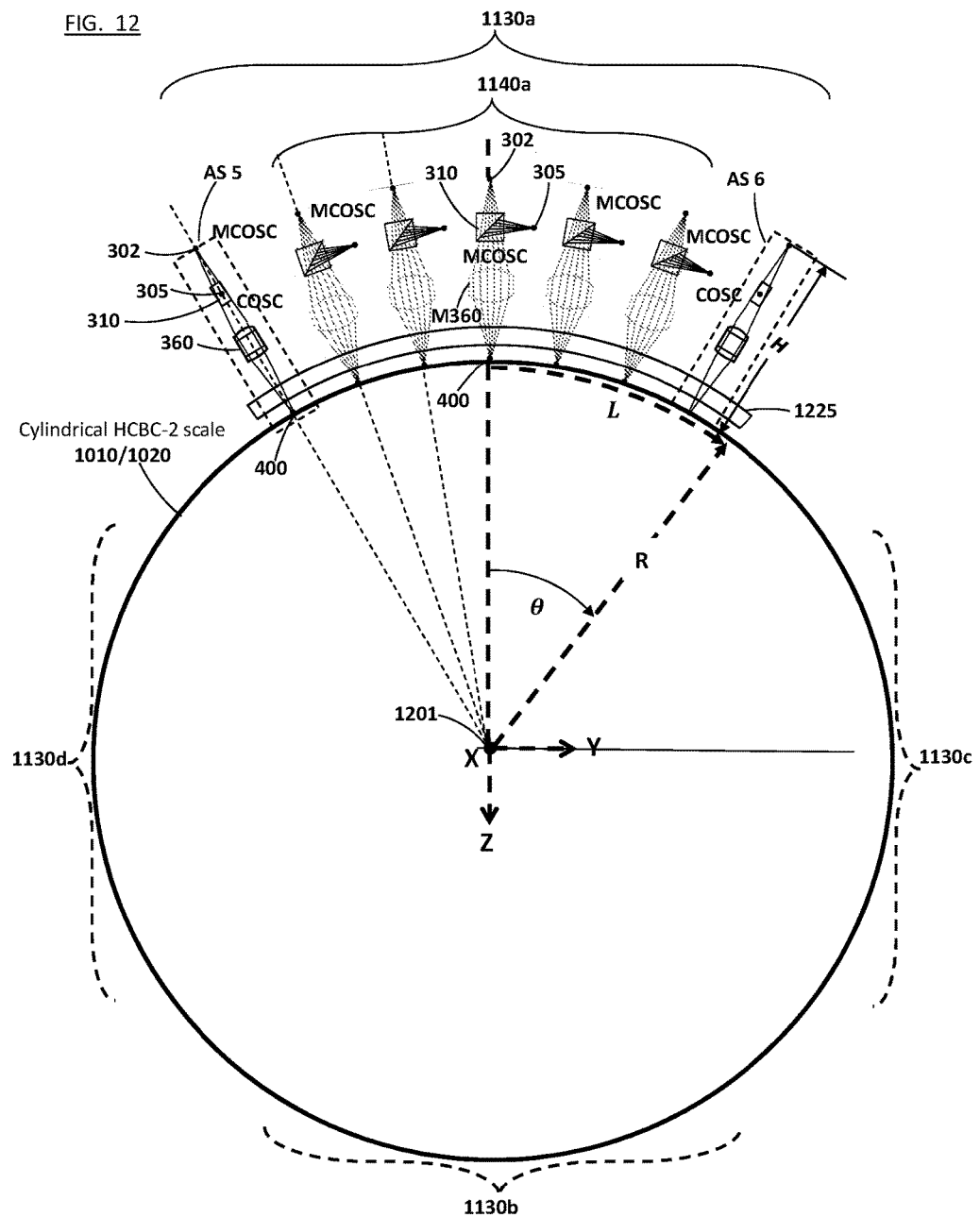

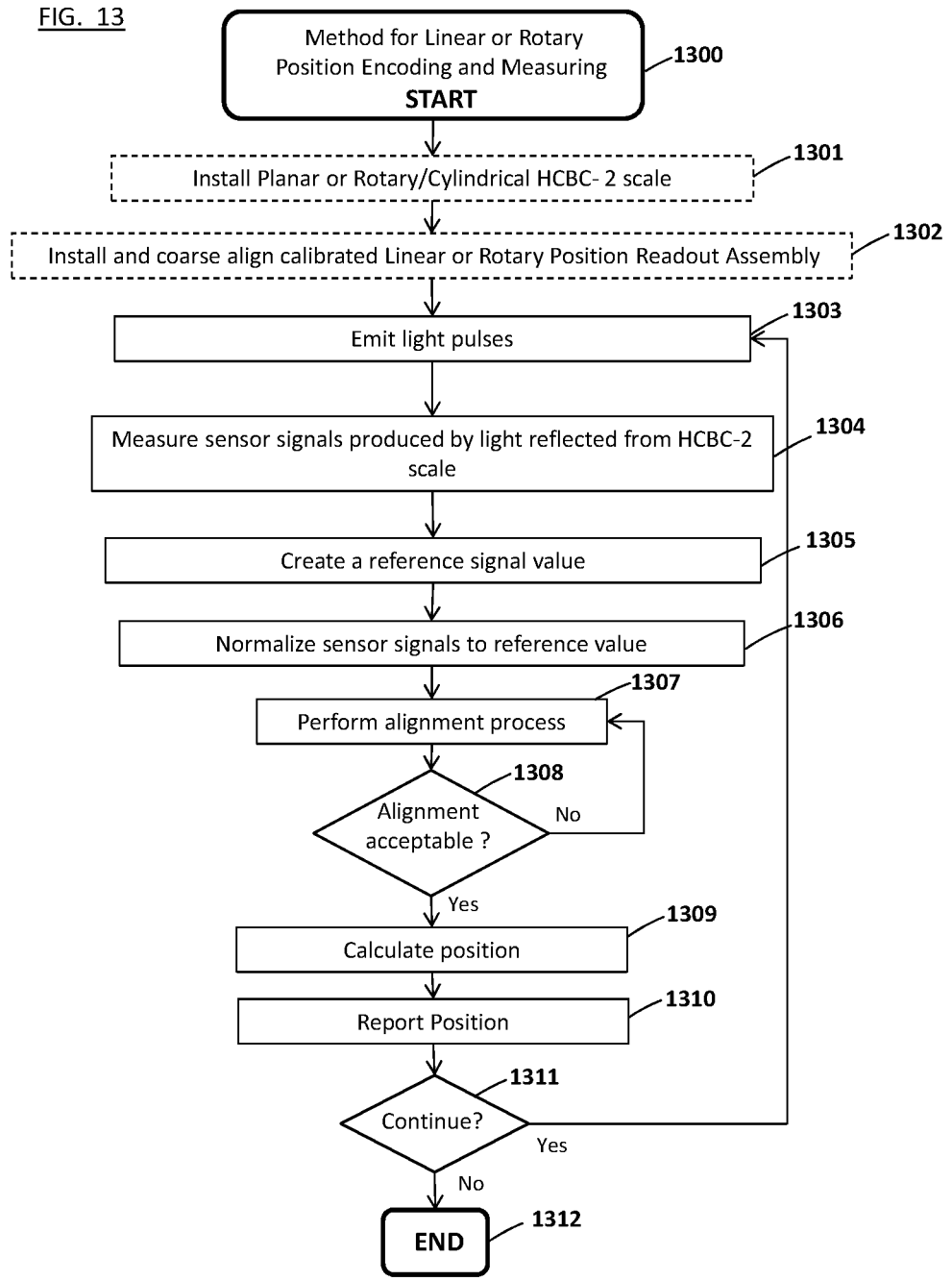

FIG. 14

| Stripel Width Qs in nanometers = | | | 100 | | | | |
|---|---|---|---|---|---|---|---|
| | Total Number of Encoded Stripels $N_s$ | | | | | | |
| Minimum | 1,048,576 | 2,097,152 | 4,194,304 | 8,388,608 | 16,777,216 | 33,554,432 | Total No. of |
| Square Wave | Encoded Scale Length (mm) | | | | | | |
| Period $\Lambda_{min}$ | 104.858 | 209.715 | 419.430 | 838.861 | 1,677.722 | 3,355.443 | Unweighted |
| in Stripels | Total No. of Code Tracks $p_{max}$ | | | | | | Tracks |
| 4 | 40 | 42 | 44 | 46 | 48 | 50 | 0 |
| 8 | 42 | 44 | 46 | 48 | 50 | 52 | 6 |
| 16 | 48 | 50 | 52 | 54 | 56 | 58 | 14 |
| 32 | 62 | 64 | 66 | 68 | 70 | 72 | 30 |
| 64 | 92 | 94 | 96 | 98 | 100 | 102 | 62 |
| 128 | 154 | 156 | 158 | 160 | 162 | 164 | 126 |

FIG. 15

| Stripel Arc Length in nanometers = | | | 100 | | | | |
|---|---|---|---|---|---|---|---|
| | Total Number $N_s$ of Encoded stripels per Revolution | | | | | | |
| | 131,072 | 262,144 | 524,288 | 1,048,576 | 2,097,152 | 4,194,304 | |
| | Encoded Scale Circumference (mm) for 100 nm stripel arc length | | | | | | |
| | 13.1072 | 26.2144 | 52.4288 | 104.8576 | 209.7152 | 419.4304 | |
| | Encoded Scale Diameter (mm) for 100 nm stripel arc length | | | | | | |
| Minimum | 4.1722 | 8.3443 | 16.6886 | 33.3772 | 66.7544 | 133.5088 | |
| Square Wave | Angular Stripel Length (μrad) | | | | | | Total No. of |
| Period $\Lambda_{min}$ | 47.93690 | 23.96845 | 11.98422 | 5.99211 | 2.99606 | 1.49803 | Unweighted |
| in Stripels | Total No. of code tracks $p_{max}$ | | | | | | Tracks |
| 4 | 34 | 36 | 38 | 40 | 42 | 44 | 0 |
| 8 | 36 | 38 | 40 | 42 | 44 | 46 | 6 |
| 16 | 42 | 44 | 46 | 48 | 50 | 52 | 14 |
| 32 | 56 | 58 | 60 | 62 | 64 | 66 | 30 |
| 64 | 86 | 88 | 90 | 92 | 94 | 96 | 62 |
| 128 | 148 | 150 | 152 | 154 | 156 | 158 | 126 |

LINEAR AND ROTARY MULTITRACK ABSOLUTE POSITION ENCODER AND METHODS USING THE SAME

BACKGROUND

Highly accurate and high sample rate linear and rotational position encoders in the servo control loops of precision industrial machines can significantly improve machine accuracy and speed. Such improvements may be achieved by providing higher bandwidth position and velocity feedback, (i.e., higher position sample rate), and by eliminating position errors associated with wear, flexure and looseness in mechanical linkages (e.g., gears, levers and cams).

Optical multitrack absolute encoders (e.g., with binary digital Gray code scales) are often dismissed in favor of single-track approaches due to the possibility of measurement errors arising from imperfect alignment of readout mechanisms with respect to the measurement scale. However, absolute encoders in general have potential advantages of improved accuracy and machine operator safety.

The present disclosure relates to improved multitrack optical absolute position encoding systems and methods. As will become apparent, the systems and methods disclosed herein may significantly reduce position error and at the same time provide higher measurement sample rates.

BRIEF DESCRIPTION OF THE DRAWINGS

FIG. 12 is a YZ cross-section view of an example Optical Absolute Rotary Position Encoder showing five example MCOSCs operating as position readouts and two example rotated COSCs operating as alignment sensors, all configured to align and read out a rotating cylindrical HCBC-2 scale with axis perpendicular to the plane of the drawing, consistent with various embodiments of the present disclosure.

FIG. 13 is a flow diagram illustrating example operations of a method for measuring the linear or rotary position of an object with an Optical Absolute Linear Position Encoder or an Optical Absolute Rotary Position Encoder, consistent with various embodiments of the present disclosure.

FIG. 14 is a table of parameters for several non-limiting examples of a HCBC-2 Planar Scale tailored for use with an Optical Absolute Linear Position Encoder, consistent with the mathematics of the HCBC code patterns disclosed in the prior art of U.S. Non-Provisional patent application Ser. No. 15/711,238 and various embodiments of the present disclosure.

FIG. 15 is a table of parameters for several non-limiting examples of a HCBC-2 Cylindrical Scale, tailored for use with an Optical Absolute Rotary Position Encoder, consistent with various embodiments of the present disclosure consistent with the mathematics of the HCBC code patterns disclosed in the prior art of U.S. Non-Provisional patent application Ser. No. 15/711,238 and various embodiments of the present disclosure.

DETAILED DESCRIPTION

Figure 1:
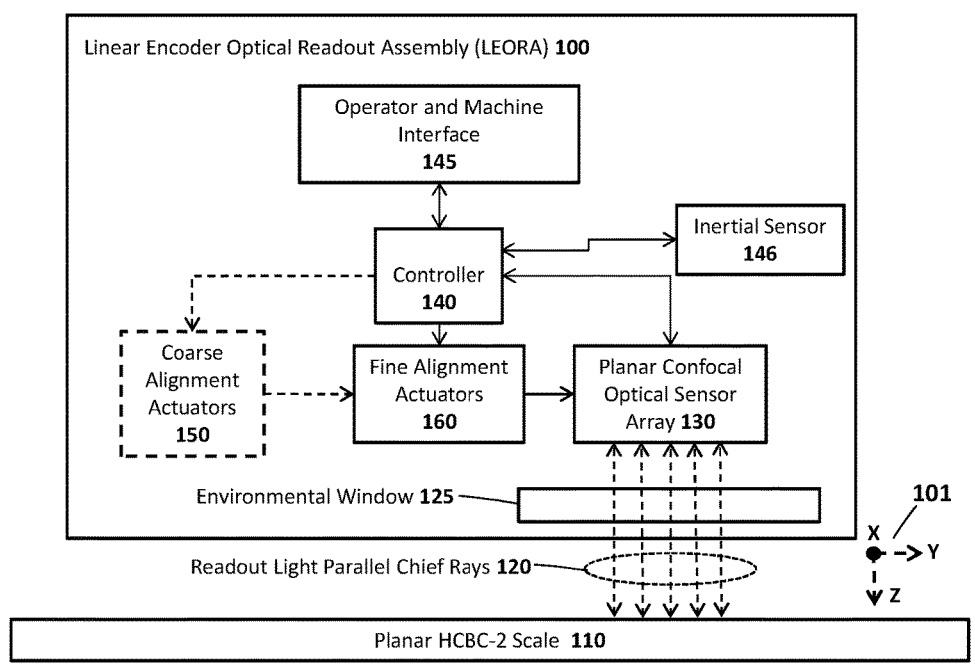
FIG. 1 is a high level block diagram of one example of an Optical Absolute Linear Position Encoder consistent with the present disclosure, showing light rays generated in a Confocal Optical Sensor Array that impinge upon and are reflected to optical sensors by a Planar Hybrid Cyclic Binary Code-2 (HCBC-2) scale, consistent with various embodiments of the present disclosure.

The present disclosure generally relates to Optical Absolute Linear Position Encoders (OALPE), Optical Absolute Rotary Position Encoders (OARPE), and methods using the same. The disclosed encoders each include a multitrack Hybrid Cyclic Binary Code-2 (HCBC-2) encoded scale and an Optical Readout Assembly (ORA), where the ORA provides absolute position optical readout and automatic physical alignment to their respective scales. In embodiments, an HCBC-2 scale is attached to or written on a planar or a cylindrical substrate. Both scale embodiments are derived from the Hybrid Cyclic Binary Code (HCBC), disclosed in U.S. Non-Provisional patent application Ser. No. 15/711,238 (hereinafter, the "'238 application") titled "Non-Contact Coordinate Measuring Machine using Hybrid Cyclic Binary Code Structured Light," the entirety of which is incorporated herein by reference. A discussion of mathematical requirements in equation form and flowchart drawings pertaining to the generation and decoding of the HCBC for performing 3D surface profiling measurements are found in the '238 application and so are not reiterated here in the interest of brevity.

The HCBC-2 scale in a linear position encoder embodiment includes a planar two-dimensional physical layout of several binary bar pattern tracks. In contrast, the HCBC-2 scale in a rotary position encoder embodiment includes a similar set of tracks on either a flexible thin sheet substrate that is wrapped around the outside or the inside of a cylindrical drum or a set of tracks that is etched or written on the outside or inside surface of the cylindrical drum. A transparent cylindrical shell substrate is used when the set of tracks is on the inside surface.

In the '238 application the HCBC code is projected as structured light in a time sequence and thus is read out as a serial time sequence. In contrast the linear and rotary absolute position encoders described herein utilize a modification of the HCBC code (hereinafter "HCBC-2") which is embodied as a set of patterned scale tracks. The entire set of tracks may be read out in a much shorter time by use of fixed arrays of individual sensor units (cells), i.e., an array of parallel readouts. The result is that the readout of code bits (binary values) for all tracks may be nearly simultaneous (e.g., less than 10 nanoseconds (ns) lag or lead). This allows a high temporal readout rate of either linear or rotational position, e.g., 200 kilohertz (kHz), 500 kHz or even greater than 1 megahertz (MHz) sampling rate.

The HCBC-2 code of the present disclosure also differs from the HCBC code described in the '238 application in that it pairs the code with a reflected and complementary version, where "complementary" means that a "1" binary bit in the code pattern is replaced by a "0" bit in the corresponding location in the reflected code pattern and vice versa. A detailed example of the resulting two-dimensional HCBC-2 pattern as compared to a two-dimensional HCBC pattern is provided in FIG. 6 of the present disclosure. Another difference is that the multitrack scales for both linear and rotary encoders in the present disclosure include two outer, not encoded, alignment tracks that perform an alignment function on either side of a central group of HCBC-2 position measurement tracks, illustrated in FIGS. 2, 6 and 11. For example, the alignment tracks are used in conjunction with alignment sensors and controlled alignment actuators to maintain accurate physical alignment of Encoder Readout Assemblies with respect to the HCBC-2 scales.

The term "stripel" is introduced in '238 application and is used also throughout the present disclosure to indicate a one-dimensional distance measurement unit. It is a convenient shortened name to represent "stripe resolution element," which has equivalent other names such as "digital resolution element" and "quantization increment." In any HCBC or HCBC-2 scale embodiment there is a chosen stripel width Qs. For the sake of example, Qs=100 nm (0.1 µm) is used in various embodiments throughout the present disclosure. Larger or smaller stripel values may be chosen, with smaller values resulting in a larger number of total encoded stripels for a given track length and therefor a need to add one or more scale tracks. The tables of FIGS. 14 and 15 with associated discussions have been included in the present disclosure in order to facilitate different encoder design embodiments.

The example 100 nm stripel width embodiment value was chosen because of its compatibility with a relatively short (e.g., 400 nm) light source wavelength and a moderate value (e.g., 0.3) of optical numerical aperture (NA) in readout cells, together resulting in diffraction-limited optical point spread functions with width of about 1 µm. Other values of NA and physical point spread function width may be used as would be understood by those skilled in the art.

Measurement error of less than Qs (e.g., to 0.1 or even 0.01 of Qs) may be achieved by extrapolation inside of an identified stripel using methods disclosed in the '238 application. In addition, averaging of multiple (e.g., 5, 10, 20 or more) simultaneous measurements (discussed in the present disclosure by use of multiple readout lines as illustrated in FIGS. 1, 2, 8, 10, 11 and 12) may enable accuracy improvement in addition to that available from extrapolation alone.

FIG. 1 is a high-level block diagram representing one example of an Optical Absolute Linear Position Encoder (OALPE) for determining linear position and velocity of a moving object, consistent with the present disclosure. Optical Absolute Linear Position Encoder (OALPE) includes Linear Encoder Optical Readout Assembly (LEORA) 100, Readout Light Parallel Chief Rays (RLPCR) 120, and Planar HCBC-2 Scale 110. Coordinate orientation indicator 101 defines the Y coordinate as parallel to the direction of measurement and the encoding direction of each of the tracks of scale 110, also the Z coordinate as parallel to the direction of focus alignment. The X coordinate is normal to the plane of the drawing.

Linear Encoder Optical Readout Assembly (LEORA) 100 in FIG. 1 includes Operator and Machine Interface 145, Controller 140, Planar Confocal Optical Sensor Array (PCOSA) 130, Fine Alignment Actuators 160, optional Coarse Alignment Actuators 150, Environmental Window 125, and Inertial Sensor 146.

Operator and Machine Interface 145 is configured to provide electrical power and data transfer to and from Controller 140 in LEORA 100. Controller 140 is configured to send and receive data (i.e., electrical signals) to and from Inertial Sensor 146, PCOSA 130, Fine Alignment Actuators 160 and optional Coarse Alignment Actuators 150. In some embodiments, Coarse Alignment Actuators 150 may be used only for initial installation of the entire OALPE, at which time they may be manually adjusted, e.g., by fine thread mechanical lead screws.

Controller 140 is configured to generate electrical alignment control signals from electrical signal samples created in PCOSA 130 as well as to calculate measured Y position and velocity for data reporting via Operator and Machine Interface 145. In embodiments the Fine Alignment Actuators 160 may be configured to provide piezoelectric, electrostatic or electromagnetic forces in response to electrical control signals from Controller 140 to control the focus (Z direction), pitch angle, roll angle, yaw angle and track centering (X direction) error of LEORA 100 with respect to Planar HCBC-2 scale 110.

Optional Coarse Alignment Actuators 150 may operate in series with Fine Alignment Actuators 160, i.e., to provide a larger and constant additive or subtractive value to a given alignment coordinate. Position and velocity error signals may be generated in Controller 140 by comparison of measured position and velocity using signals from PCOSA 130 and operator and machine interface 145.

Again in FIG. 1, Planar Confocal Optical Sensor Array (PCOSA) 130 is comprised of an array of light sources (lasers or light emitting diodes) and an array of light sensors, preferably Complementary Metal Oxide Semiconductors (CMOS) photodiode pixels, in a confocal optical configuration as to be described in detail in relation to FIGS. 2, 3, 8 and 9.

Readout Light Parallel Chief Rays (RLPCR) 120 represent a plurality of single central light rays (an example is single light ray 390 in FIG. 3) that is emitted by an individual light source (an example is shown as light source 302 in FIG. 3) and caused to travel in the Z direction. It is then reflected from binary scale 110 in the reverse Z direction, with the magnitude of the reflection depending upon Z focus and its Y position on the binary coded scale. Optimum Z focus is maintained by a Z (focus) actuator control loop such that the reflected light magnitude varies nearly completely as a function of the Y position of the encoder body relative to scale 110. The reflected rays are each received by a known light sensor pixel in each of a plurality of confocal sensor cells (an example is light sensor 305 in FIG. 3).

In FIG. 1 it can also be seen using coordinate orientation symbol 101 that each of the plurality of RLPCR's is associated with a unique value of Y measurement coordinate. Therefore, knowledge of the pre-calibrated Y displacement of each readout line from central readout line (RL C) allows an averaging of a plurality of simultaneous absolute position measurements to be made. For nine readout lines, the effect of sensor random noise error may be reduced by a factor of 3.

Figure 2:
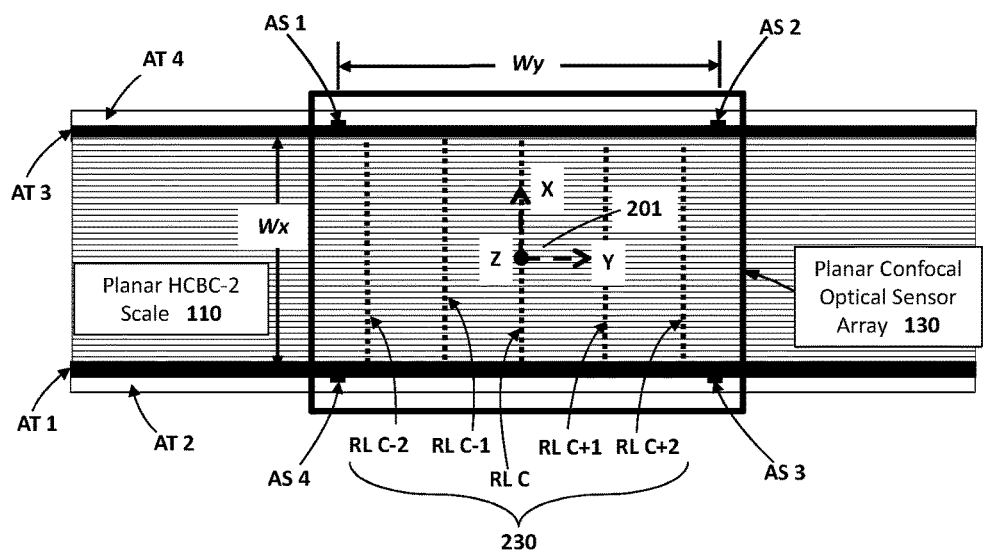
FIG. 2 is a view of a Planar Confocal Optical Sensor Array and a portion of a Planar HCBC-2 Scale with alignment tracks, seen from a direction perpendicular to the plane of the Scale, consistent with various embodiments of the present disclosure. An example five Readout Line Assemblies in a Readout Line Array and four individual alignment sensors in the Planar Confocal Optical Sensor Array is also shown, consistent with various embodiments of the present disclosure.

FIG. 2 is a view in the Z direction showing a section of Planar HCBC-2 Scale 110, which includes alignment tracks AT 1 through AT 4. Also shown superimposed are the various parts of Planar Confocal Optical Sensor Array (PCOSA) 130. Readout line assembly 230 in the drawing comprises an example array of five position readout lines (RL C−2, RL C−1, RL C, RL C+1, RL C+2), all parallel to the X axis of coordinate indicator 201. Line RL C is seen as the center readout line of the array and its Y position may be used to represent the encoder's position. In an example embodiment, each readout line is composed of 68 pairs of point light sources and point sensors in a confocal configuration, consistent with the 68 code tracks in the example Planar HCBC-2 Scale 110 shown in FIG. 6. Fewer than 68 tracks and dots in the readout lines of FIG. 2 have been drawn for visual clarity.

PCOSA 130 also comprises four alignment sensors AS 1, AS 2, AS 3 and AS 4 in an XY plane, each at a corner of a rectangular housing with dimensions Wx and Wy. In one example linear position encoder embodiment using 9 readout lines, Wx may be about 8 mm and Wy about 12 mm. However, FIG. 2 shows only 5 instead of 9 readout lines for visual clarity.

The origin of coordinate indicator symbol 201 may be considered to be at the geometrical center of an XY plane on PCOSA 130, whereas Planar HCBC-2 Scale 110 may be in another XY plane along the Z axis into the drawing. Rotation about the Z axis is defined as yaw angle, whereas pitch angle is defined as a rotation about the X axis and roll angle is defined as a rotation about the Y axis.

Figure 5:
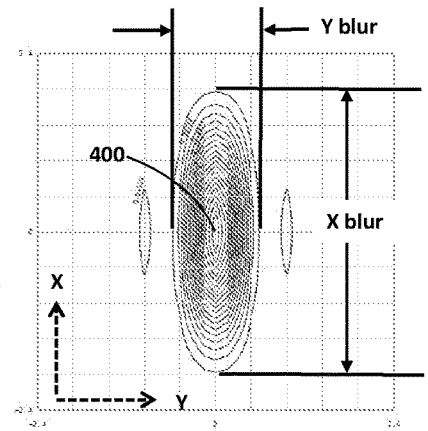
FIG. 5 is an XY contour plot of the optical image point spread function shown in FIG. 4, consistent with various embodiments of the present disclosure.

The example of FIG. 2 illustrates a condition of zero misalignment. In that condition all four alignment sensors are centered over a transition line between the white (AT 2 and AT 4) and black (AT 1 and AT 3) alignment tracks. For zero misalignment the normalized signals from the alignment sensors are equal and no actuator correction motion is required. In many applications, however, there may be X and yaw misalignments to be detected by the alignment sensors. If the sensor signal from AS 1 is defined as $S_1$ and the signal from AS 2 is defined as $S_2$, etc., with knowledge of the Y distance Wy between AS 1 and AS 2 and also between AS 4 and AS 3, error signals for small rotation and decentering (such as may be expected during system operation after initial alignment) may be created in controller 140 using the following equations:

$$\Delta X = K_X(S_1 + S_2 - S_3 - S_4) \quad (1)$$

$$\varphi = (K_{YAW})(S_1 - S_2 + S_2 - S_4)/Wy \text{(radians)} \quad (2)$$

where $\Delta X$ is the X alignment error, $\varphi$ is the yaw misalignment error and Kx, Kyaw are calibration constants. For large X misalignments, the elliptical blur regions of the alignment sensors' point spread functions (PSF's; FIG. 5) may be entirely within white or black alignment tracks, such that only maximum or minimum signal values are available. However, the error direction (i.e., +X or −X in FIG. 2) may still be determined, and with the aid of velocity feedback (damping) signals from Inertial Sensor 146 the controller may rotate and/or translate Confocal Optical Sensor Array 130 in the proper directions. i.e., large error signal $\Delta X$ can first be reduced to the point where it is in the linear region of $\Delta X$ vs. signals $S_1$, $S_2$, etc. that are presented in Equation (1). The controller may then use Equations (1) and (2) in conjunction with velocity feedback from Inertial Sensor 146 to minimize $\Delta X$ and yaw angle $\varphi$.

For clarity and ease of understanding FIG. 2 depicts AT 1 and AT 3 as "black" (low reflectance) tracks and AT 2 and AT 4 as "white" (high reflectance) tracks, but any configuration in which the reflectivity value of one track in a pair of tracks is interchanged with the reflectivity value of another track in the pair of tracks can be used.

Since the alignment sensors AS 1, AS 2, AS 3 and AS 4 at the corners of PCOSA 130 are rotated (e.g., 90°) with respect to the position readout sensors in readout line array 230, the diffraction blur spot for these sensors is narrower in the X direction. Therefor the alignment sensors can measure linear alignment position in the X direction most accurately, relative to identical sensors in the readout lines that are not rotated and are designed to measure linear position errors most accurately in the Y direction.

Figure 6:
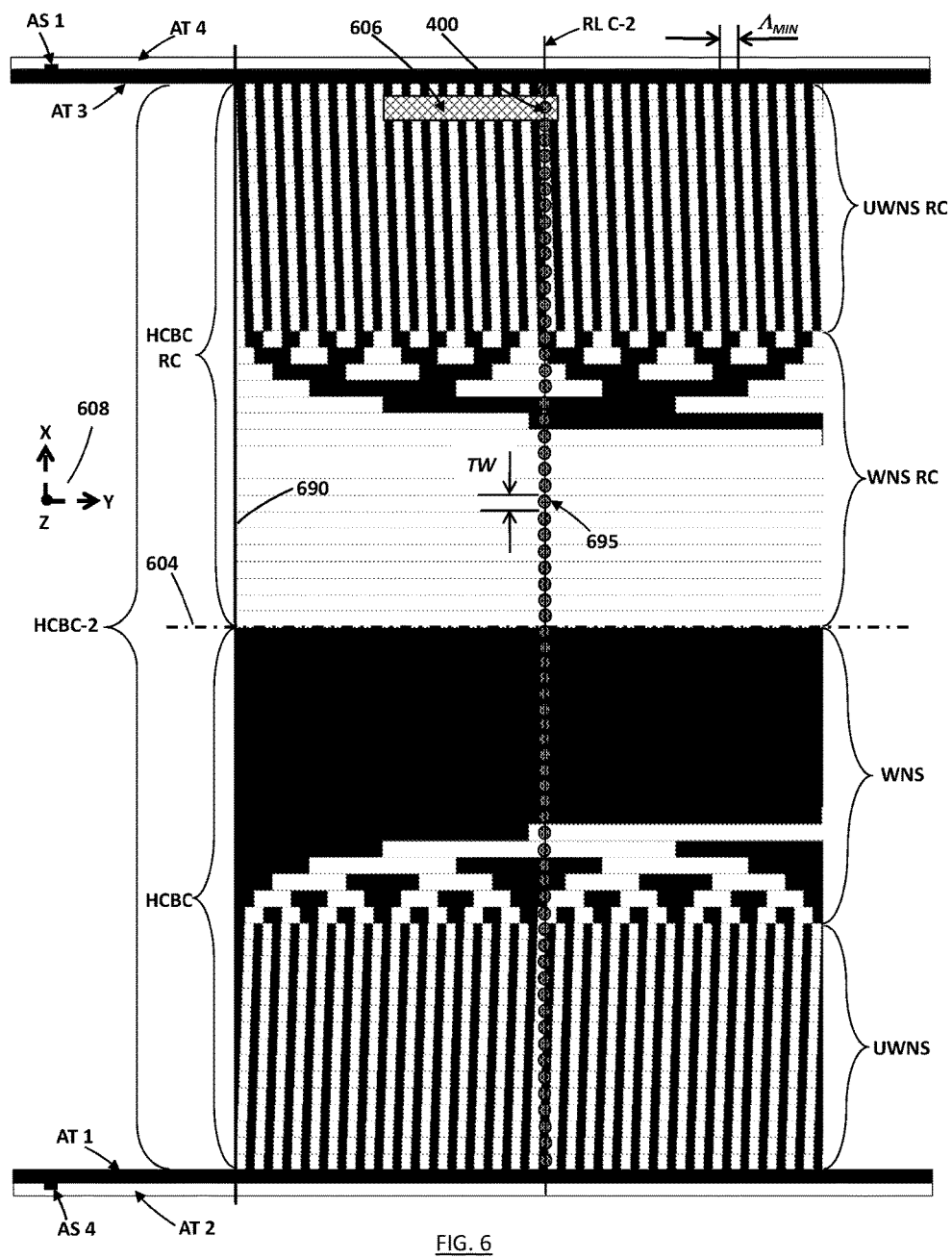
FIG. 6 is a not-to-scale illustration of a selected region of an example 68 track HCBC-2 Planar or Cylindrical Multitrack Scale consistent with the present disclosure, showing sub-regions of Unweighted Numbering System single period variable offset bar patterns and sub-regions of Weighted Numbering System multiple period constant offset bar patterns, consistent with the mathematics of the HCBC code patterns disclosed in U.S. Non-Provisional patent application Ser. No. 15/711,238 (the '238 application) and various embodiments of the present disclosure.

If the residual controlled $\Delta \varphi$ error after sensing by the PCOSA's, Inertial Sensor 146 and correction by at least one Fine Alignment Actuator 160 is as small as 5 microradians (μrad), (which will later be shown is a reasonable value after yaw error sensing and correction), the Y error for the extreme outer track sensors on center line RL C-2 (here referencing the HCBC-2 code configuration illustrated in FIG. 6) would be $\Delta Y = 2$ mm x $1^{-3}$ m/mm x $5^{-6}$ radians $= 1^{-8}$ m, or 10 nm. This error may be reduced by averaging the error values measured in each of e.g., 9 readout lines, each of which provide two position measurements as a result of the redundant reflective nature of code tracks in the HCBC-2 code, e.g., as shown in FIG. 6. For random Gaussian sensor noise statistics, such averaging may provide an error reduction factor of $\sqrt{18} = 4.24$, such that the overall Y position measurement error may reduce to 2.4 nm.

Figure 3:
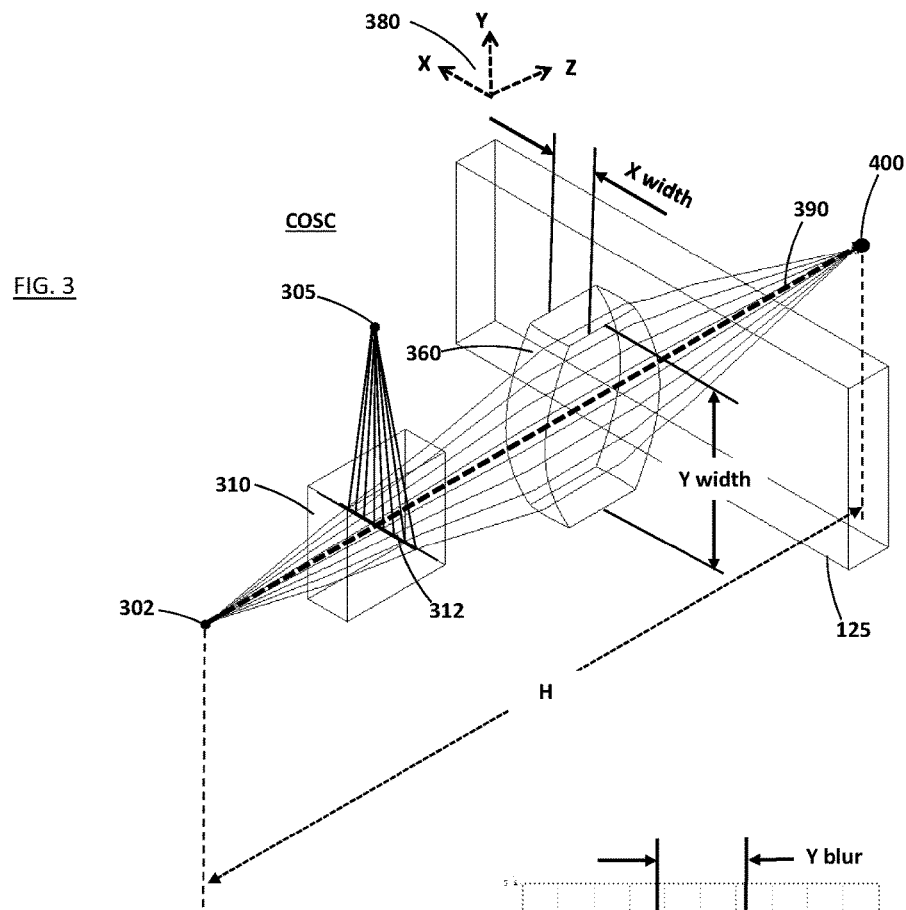
FIG. 3 is an annotated 3D isometric drawing of an example Confocal Optical Sensor Cell (COSC) including a portion of an exterior transparent window, consistent with various embodiments of the present disclosure.

Attention is now drawn to FIG. 3, which illustrates an example optical design for each Confocal Optical Sensor Cell (COSC) in an example Linear Encoder Optical Readout Assembly (LEORA) 100. For 9 readout lines and 68 tracks, the total number of COSC readout sensor cells would be 68 X 9=612. In addition to the code readout cells, each LEORA contains at least four Alignment Sensor (AS) cells discussed previously in regard to FIG. 2. Each AS has the same optical design as the LEORA readout cells, but is rotated about its axis by 90 degrees in order to best determine signal magnitude variations in the X direction.

It may be seen in FIG. 3 that a single Confocal Optical Sensor Cell (COSC) is in a confocal microscope configuration. Light from point source 302 passes into transparent prism section 310 and then through a 50% nominal transmission beam splitter 312. The remaining 50% of the source light then is focused by lens 360 and passes through part of transparent planar window 125 to form blur spot 400 on scale 110 (the scale is not shown in FIG. 3). A portion of the light ray bundle reflected from scale at blur spot 400 returns to lens 360. Without beam-splitter surface 312 it would be focused to form a conjugate image at light source 302. However, with beam-splitter 312, roughly half of the light is focused on light sensor 305. Light source 302, photodiode sensor 305 and scale measurement point 400 (FIGS. 4 and 5) remain as confocal images of each other despite any differences in transmitted or reflected light magnitude.

The part of the incoming light reflected from Planar HCBC-2 scale 110 and reaching light source 302 is lost from the light that reaches sensor 305, but is expected to have no effect on the performance of source 302. Polarized light sources (e.g., laser diodes such as Vertical Cavity Surface-Emitting Lasers, rather than LED's) may be used in concert with quarter-wave plates to increase the light impinging on sensor 305 and reduce the amount impinging on source 302, i.e., improving optical efficiency. Optical configurations for that purpose will be understood by those skilled in the art.

Figure 4:
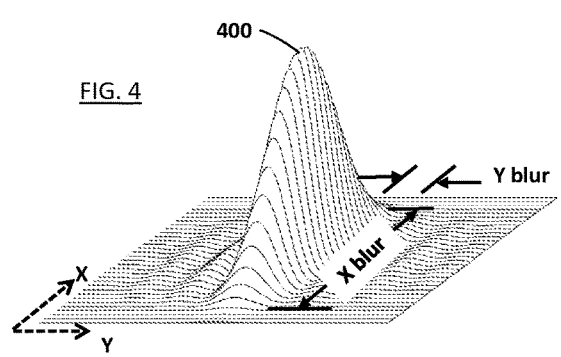
FIG. 4 is a 3D surface plot generated by optical software showing a diffraction-limited point spread function (i.e., blurred image irradiance in the presence of optical aberrations and diffraction as a function of X and Y coordinates) produced by the Confocal Optical Sensor Cell (COSC) design and window shown in FIG. 3, consistent with various embodiments of the present disclosure
Figure 9:
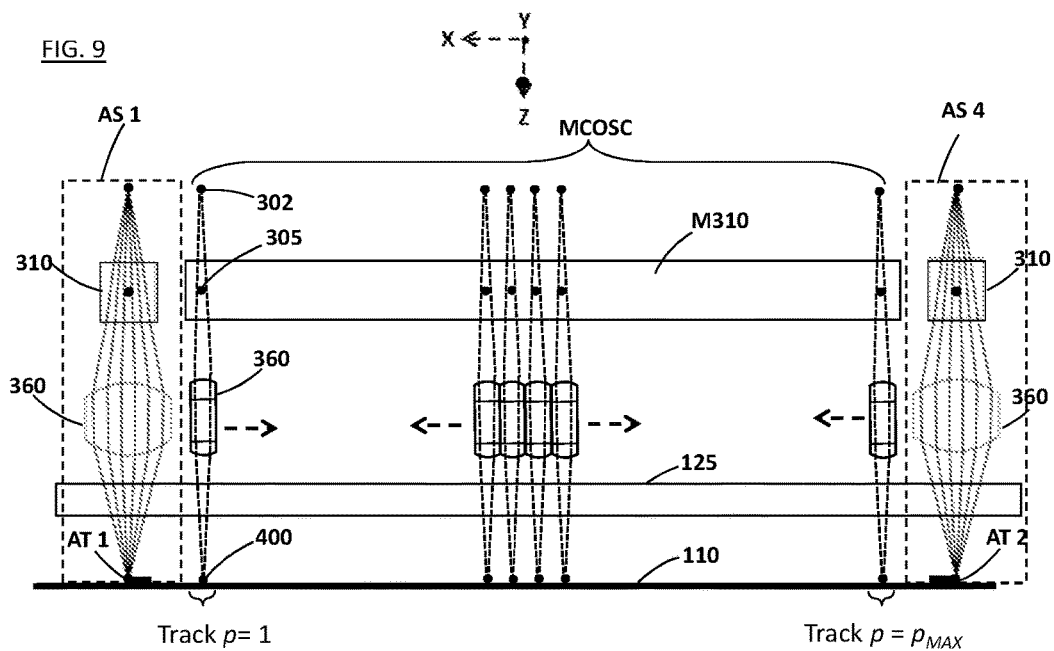
FIG. 9 is a cross-section view in the XZ plane of a merged plurality of confocal optical sensor cells (MCOSCs) in a single readout line used for Y position readout, plus two single rotated COSCs used as alignment sensors in a second XZ plane, consistent with various embodiments of the present disclosure.

Considering the small area of scale readout spot 400 in FIGS. 3-5, the confocal microscope approach to illumination maintains light source 302 energy only on important regions of the scale (i.e., readout lines) with none between readout lines. There may be light diffusely reflected from the scale at spot 400 in each track such that some light from one track is reflected into the confocal lens of an adjacent track, i.e., in the +/−X directions. However, this is not expected to cause any significant crosstalk because the angle of incidence of the potential crosstalk light rays is mostly outside the cone of rays accepted by any light sensor 305. This has been verified by detailed optical ray tracing using commercial software Zemax®OpticStudio®. As a result, absorbing films between COSC's are not necessary to avoid crosstalk, allowing a wider range of methods for fabricating e.g., a Merged COSC (MCOSC) readout line such as illustrated in FIG. 9.

Lens 360 in the example embodiment shown in FIG. 3 is a biconic singlet (i.e., a single lens when viewed in the direction of the chief ray having a rectangular rather than a circular light collection aperture). In some cases a biconic lens has front and back surfaces that have different spherical or aspherical curvature in the X versus the Y direction. In the case of lens 360, the surface curvatures are the same for both X and Y directions in order to produce a focus at point 400 for each, but the lens X width (100 µm in the example embodiment of FIG. 3) is significantly less than its Y width (800 µm in the example embodiment of FIG. 3) as can be seen. The result is that the illumination profile of diffraction-limited blur spot 400 will be somewhat elliptical, with the X blur being significantly greater than the Y blur. This may be seen for optical ray trace blur spot 400 in FIGS. 4, 5, and 7.

Environmental Window 125 in FIG. 3 may be a plane parallel strip of glass or other material to transmit all readout light rays, including Readout Light Parallel Chief Rays (RLPCR) 120, while providing environmental protection for the interior of LEORA 100. In embodiments all of the light sources and sensors in PCOSA 130 are synchronized to emit and receive short duration (e.g., 1-50 ns) light pulses at a designated repetition rate (e.g., 500 kHz or greater) with pre-calibrated light output pulse energy. Returning light that is not reflected by beam-splitter surface 312 can continue beyond to impinge upon light source 302.

The Y direction distance between readout lines may be pre-calibrated and known such that averaging measurements from several measurement lines may provide improved readout accuracy. The light rays reflected from any single measurement point on the scale are in general scattered, with a substantial fraction of the scattered light being collected by the same MCOSC that generated the light. In the example embodiment of the present disclosure, the total length H of chief ray 390 (between LED 302 and image point 400) and the entire COSC is about 3.3 mm.

Figure 8:
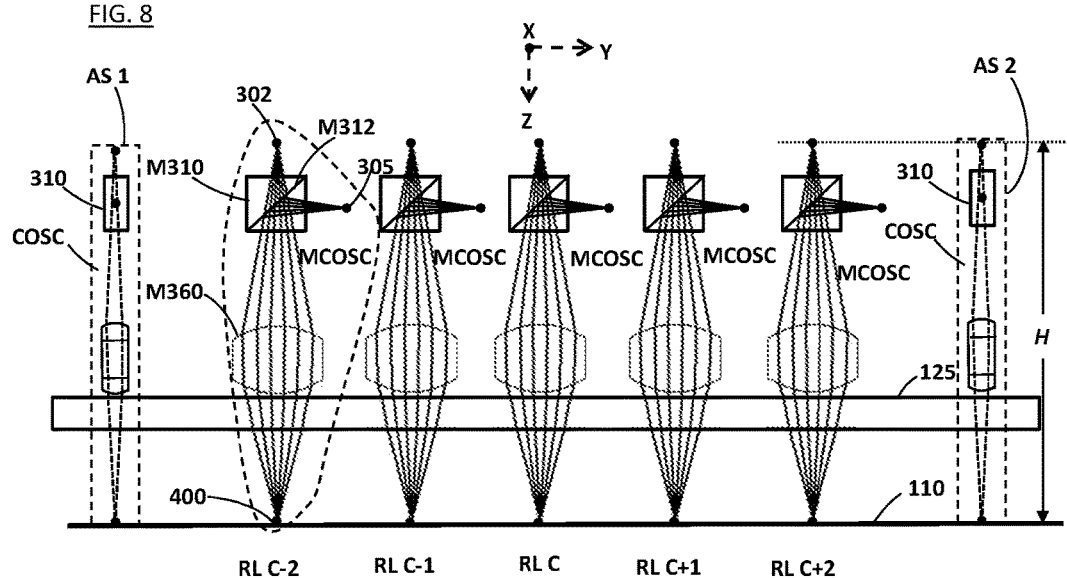
FIG. 8 is a cross-section view in the YZ plane showing an example of five Merged Confocal Optical Sensor Cells (MCOSC) and a cross-section of an environmental window, consistent with various embodiments of the present disclosure.

The COSC in FIG. 3 represents a sensor cell which may be used "as is" and rotated 90° to serve for Alignment Sensors AS 1-AS 4, as may be seen in FIGS. 8 and 9. However, for the readout line sensor array 230 it is advantageous to stack ("merge") COSC's in the X dimension such that each X width equals one HCBC-2 track width. Also, since the beam splitters 310 have all planar faces, it is possible and desirable to fabricate a single long beam splitter rod M310 by gluing together the hypotenuses of two long 45°×90°×45° triangular prisms, with one hypotenuse carrying a thin beam splitter coating. As a result of the above considerations it has been found desirable for clarity of understanding to define a Merged Confocal Optical Sensor Cell (MCOSC) which includes a merged beam splitter M310 in addition to a merged stack of aspheric lenses 360, light sources 302 and light sensors 305. One example of an MCOSC defining a single readout line may be seen in the XZ view of FIG. 9.

FIG. 4 is one example of a surface profile of a Huygens method point spread function (PSF) for image irradiance calculated by optical simulation software for the COSC optical system of FIG. 3, considering both optical aberrations and diffraction effects. The narrow lens aperture of 100 µm in the X dimension (X width) may be expected to result in reduced lens aberrations in that dimension; however the resolution improvement gained with reduced aberrations is overwhelmed by the effect of increased diffraction, i.e., the reduced aperture creates a large diffraction effect that dominates any effect of reduced lens aberration. The example lens aperture X width of 100 µm as shown in FIG. 3 therefor results in a much larger X blur than Y blur in FIG. 4. The PSF contour plot of FIG. 5 is plotted from the same data as used for FIG. 4 and shows that calculated Y blur is about 1.2 µm as opposed to an X blur of about 3.8 µm.

FIG. 6 depicts an example Y region of a planar HCBC-2 binary scale pattern near the left hand beginning of the scale (at Y=0). Coordinate orientation indicator 608 shows the scale measurement direction Y to be to the right. The drawing is mathematically consistent with all rules for creating the scale code, but is stretched larger in the measurement direction Y and compacted in the track direction X. This is done to enable a viewer of the drawing to visualize both the (Y direction) minimum period $\Lambda_{MIN}$ of the Unweighted Numbering System (UWNS) and of the Unweighted Numbering System-Reflected Complementary (UWNS-RC) as well as the (X direction) 68 scale tracks of the example embodiment of this disclosure.

The dimension TW is not drawn to scale in FIG. 6 because the physical dimensions X blur and Y blur of optical blur spot 400 are so small (Y blur ~1 µm) compared to the total HCBC-2 scale width (68 tracks multiplied by 100 µm track width=6.8 mm) that it is not feasible to create a single page drawing that shows all tracks of the HCBC-2 scale and also the size of blur spot 400.

FIG. 6 may also be used to envision the starting region of a rotary encoder's cylindrical scale, where the scale may now be considered as a thin film wrapped around the outside or the inside of a cylinder whose axis of rotation is parallel to the X axis. shown in coordinate orientation.

Readout line RL C-2 in FIG. 6 is shown as a line through a series of readout blur circles 695, where circles 695 are large visible substitutes for much smaller readout blur spots 400. There are 68 readout circles and 68 tracks in the Figure (consistent with the example linear encoder system of the present disclosure), but any suitable number of readout circles and tracks can be used. The track width TW for all tracks has been assigned a value of 100 µm to be consistent with the COSC lens X width of 100 µm as seen in FIG. 3.

Vertical line RL C-2 represents the position of Readout Line RL C-2 as if it were near to Y=0 on the encoded scale. Two Alignment Sensors (AS 1 and AS 4) can be seen to the left of the encoded portion of the scale, where AS 1 is positioned at the transition line between track AT 3 and track AT 4, whereas AS 4 at the bottom of FIG. 6 is positioned at the transition line between track AT 1 and track AT 2. Only the two left hand side AS's are shown in the drawing because the Y distance Wy between the left-hand AS's and the right hand AS's as seen in FIG. 2 is several millimeters or more, whereas only about 1 millimeter of Y distance on the scale is shown in FIG. 6.

Again in FIG. 6, large curved bracket HCBC-2 includes all position readout tracks on the scale except for alignment tracks AT 1 and AT 3 (black examples) and alignment tracks AT 2 and AT 4 (white examples). Scale HCBC-2 therefore may be seen as including coded scale section HCBC (lower intermediate size bracket) and a reflected/complement section HCBC-RC (upper intermediate size curved bracket). The pattern reflection process may be visualized as an upward rotation of a copy of the original HCBC about hinge line 604.

Curved brackets UWNS, WNS, WNS RC and UWNS RC on the right-hand side of FIG. 6 refer respectively to Un-Weighted Numbering System, Weighted Numbering System, Reflected and Complementary Weighted Numbering System and Reflected and Complementary Un-Weighted Numbering System. It may be useful to recall that Unweighted Numbering System square wave bar patterns have the same repetition period but each has a different and unique Y offset with respect to a fixed reference. In the example embodiment of the present disclosure, the repetition period $\Lambda_{MIN}$ of the Unweighted Numbering System square wave bar patterns is 32 stripels, (3.2 µm period for the selected value of 0.1 µm stripel width). It can be seen that there are about 30 periods of these patterns shown in FIG. 6, covering a physical Y distance of only 3.2 X 30=96 µm.

The horizontal (Y) extent of all patterns shown in FIG. 6 may be estimated by counting Un-Weighted Numbering System (UNWS) bar periods for either original HCBC code (bottom of FIG. 6) or HCBC-RC code (top of FIG. 6). The result for FIG. 6 is 32 bars (and periods) shown, which indicates a horizontal distance of 32 X 32 µm=1,024 µm (1.024 mm).

Figure 7:
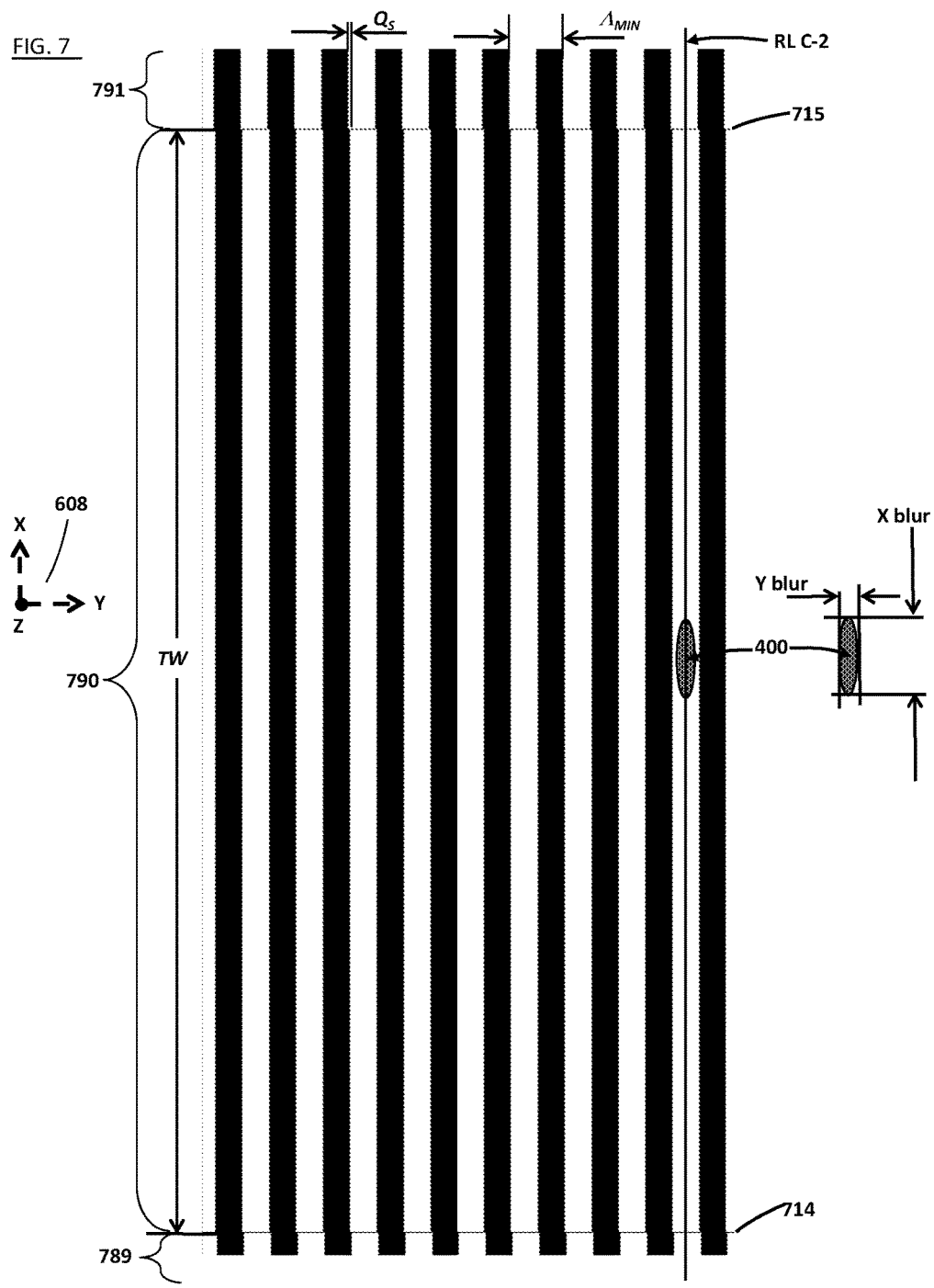
FIG. 7 is an enlarged illustration of a small region in FIG. 6, showing three contiguous vertical bar patterns representing unweighted numbering system, single period, variable offset parts of the HCBC-2 code, also showing the example optical readout blur spot of FIG. 5, consistent with the mathematics of the HCBC code patterns disclosed in the '238 application and various embodiments of the present disclosure.

Rectangular box 606 identifies the dimensions and approximate position of the entire FIG. 7 drawing with respect to that in FIG. 6. This may be verified by first confirming that the horizontal (Y) extent of the code pattern in FIG. 6 is the same as the periods of the bar pattern inside of box 606 in FIG. 6. The vertical (X) extent of the central pattern in FIG. 7 is, by definition, one track width (TW) and the height of box 606 in FIG. 6 may be seen to equal to dimensioned distance TW in the center of the drawing in FIG. 7.

FIG. 7 shows an enlarged view of one central track width 790 and the bar patterns and one example of an optical blur spot 400 and readout line RL C-2 superimposed upon central "Un Weighted Numbering System" (NWNS) bar pattern 790, and also showing portions of adjacent upper NWNS bar pattern 791 and adjacent lower NWNS bar pattern 789. Coordinate orientation indicator 608 also applies in FIG. 7. All three bar patterns are characterized by a fixed repetition period $\Lambda_{MIN}$ (3.20 µm in the example design of the present disclosure). The X length (vertical height as seen in the drawing) of the three bar patterns is equal to one scale track width TW as shown in the drawing. TW may conveniently be defined to be the same as the X width of lens 360 in FIG. 3, 100 µm in the example design. Short portions of two other bar patterns are shown above and below the central pattern in the drawing, the upper pattern starting at track edge 715 and offset to the left (shifted) by one stripel width Qs (100 nm in the example design of the present disclosure, however other values may be assigned). The lower pattern starting at track edge 714 can be seen to be offset to the right by Qs. It is convenient but not constraining to define the range of absolute offset integer values (with respect to a defined zero position) as $-(\Lambda_{MIN}/2-1)$ to $(\Lambda_{MIN}/2-1)$. This definition is used in the example embodiment of the HCBC disclosed in the '238 application.

The three readout tracks in FIG. 7 are defined by horizontal separation lines 714 and 715 parallel to the Y axis of coordinate indicator 708. In this case 68 tracks are used to provide for a maximum encoded length of 8,388,608 stripels of width 100 nm, which encodes a maximum length of 838.86 millimeters. This length may be doubled by increasing the number of readout tracks by two, i.e., resulting in 70 tracks in the above example to provide for 1,677.72 millimeters of track for the same 0.1 µm stripel width, consistent with the HCBC table values in FIG. 14. The encoded scale width (in the X dimension) for 70 code tracks plus 4 alignment track example design may therefore be about 7.4 mm, assuming all tracks have 100 µm width. By use of readout signal averaging over multiple readout lines (e.g., 9 lines or more), and position extrapolation as explained in the '238 application, absolute position measurement error may be in the range of 1-5 nm and minimum detectable motion less than 1 nm. Because of the use of confocal microscope readout sensor assemblies with pulsed global illumination and essentially instantaneous readout of all sensor elements, the maximum readout sample rate of both linear and rotational versions of the LRMAPE system may be at least 500 kHz, and in some instances at least 1 MHz. It should also be noted that the number of measurement tracks is not limited to 68 or 70, and the details of each of the tracks (e.g., their width) may differ.

Attention is now directed to FIG. 8, which illustrates an example group of five Merged Confocal Measurement Units (MCOSC's) in cross-section for a Linear Encoder, where each MCOSC provides a readout blur spot 400 on scale 110 in each of five Position Readout Lines (RL C−2, RL C−1, RL C, RLC+1 and RL C+2) on scale 110, consistent with the example five readout lines previously shown in FIG. 2. Also illustrated in FIG. 8 are two rotated Alignment Sensors (AS 1 and AS 2) consistent with their locations as seen in FIG. 2. It may be recalled from FIG. 3 that the height H between readout point 400 and LED light source 302 in the example CMU embodiment of the present disclosure is 800 μm. This may be decreased or increased without affecting measurement accuracy by scaling all of the COSC optical design dimensions down or up. Although such scaling may affect the clearance distance between lens 360 and window 125, or window 125 and scale 110, it does not affect the MCOSC numerical aperture or the Y blur size.

FIG. 9 illustrates an XZ cross section of center readout line RL C, plus two separate cross sections of COSC Alignment Sensors AS 1 and AS 4. The relative Y positions of AS 1 and AS 4 with respect to the readout sensors may be seen more clearly in the XY view of FIG. 2. As can be seen, alignment sensors AS 1 and AS 4 in FIG. 9 include COSC's that are rotated by 90° with respect to the Y position sensor MCOSC's. The reason for this configuration is to allow measurement of misalignment with respect to the Scale Alignment Tracks AT 1, AT 2, AT 3 and AT 4 with higher accuracy in the X dimension, whereas the position sensors (MCOSC's) in the readout line arrays are aligned to achieve higher accuracy in the Y dimension. Given the asymmetry of the COSC point spread function 400 shown in FIG. 5, improved misalignment sensing may be had by rotating the alignment COSC's by 90° as shown. Short sections 310 of beam-splitter prism, such as shown for prism 310 in FIG. 3, may be used for the Alignment Sensors instead of the longer prism M310 illustrated in FIG. 9. However, the longer prism M310 may be more convenient to use with a full readout array of merged (MCOSC) position sensors and may reduce overall fabrication and assembly costs.

Figure 10:
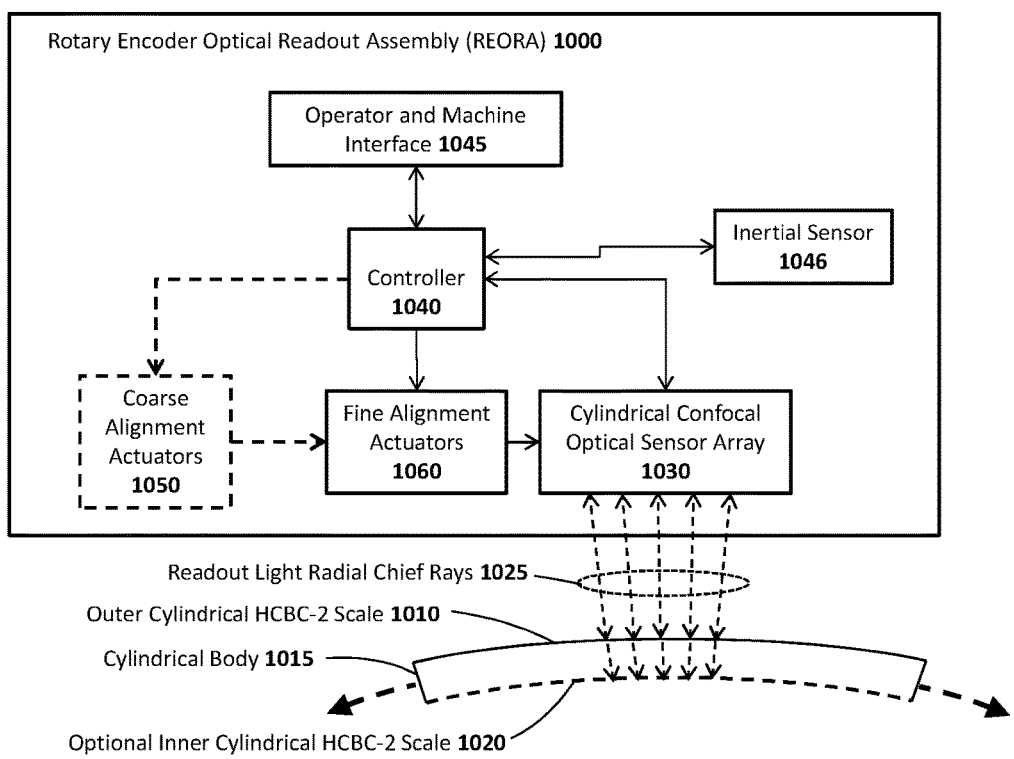
FIG. 10 is a high-level block diagram of an Absolute Optical Rotary Position Encoder (AORPE) consistent with the present disclosure, showing light rays generated in a cylindrical version of a Confocal Optical Sensor Array (COSA) impinging upon and reflected by a Cylindrical HCBC-2 Scale, consistent with various embodiments of the present disclosure.

FIG. 10 is a high level block diagram of one example of an Optical Absolute Rotary Position Encoder OARPE, consistent with the present disclosure. The rotary encoder makes use of an Outer Cylindrical HCBC-2 Scale 1010 or an Inner Cylindrical HCBC-2 Scale 1020 instead of Planar HCBC-2 Scale 110. It also makes use of Cylindrical Confocal Optical Sensor Array (CCOSA) 1130 instead of Planar Confocal Optical Sensor Array (PCOSA) 130. In addition, the rotary encoder generates Readout Light Radial Chief Rays 1025 directed to the center of scale rotation (i.e., point 1201 along the Z axis as seen in FIG. 12). In one example embodiment, Readout Light Radial Chief Rays 1025 may be reflected from an HCBC-2 scale attached to outer surface 1010 of Cylindrical body 1015. In another example embodiment, Readout Light Radial Chief Rays 1025 may first pass through a transmissive outer surface 1010, then pass through an optional transparent cylindrical shell version of body 1015, after which they are reflected by an HCBC-2 scale attached to inner surface 1020 and passed back through the same shell and surfaces to re-enter CCOSA 1030.

Operator and Machine Interface block 1045 and other elements of Rotary Encoder Readout Assembly 1000 may also perform the same functions as Operator and Machine Interface block 145 and Linear Encoder Readout Assembly 100 in FIG. 1 previously discussed; however some of the detailed configurations may differ.

Figure 11:
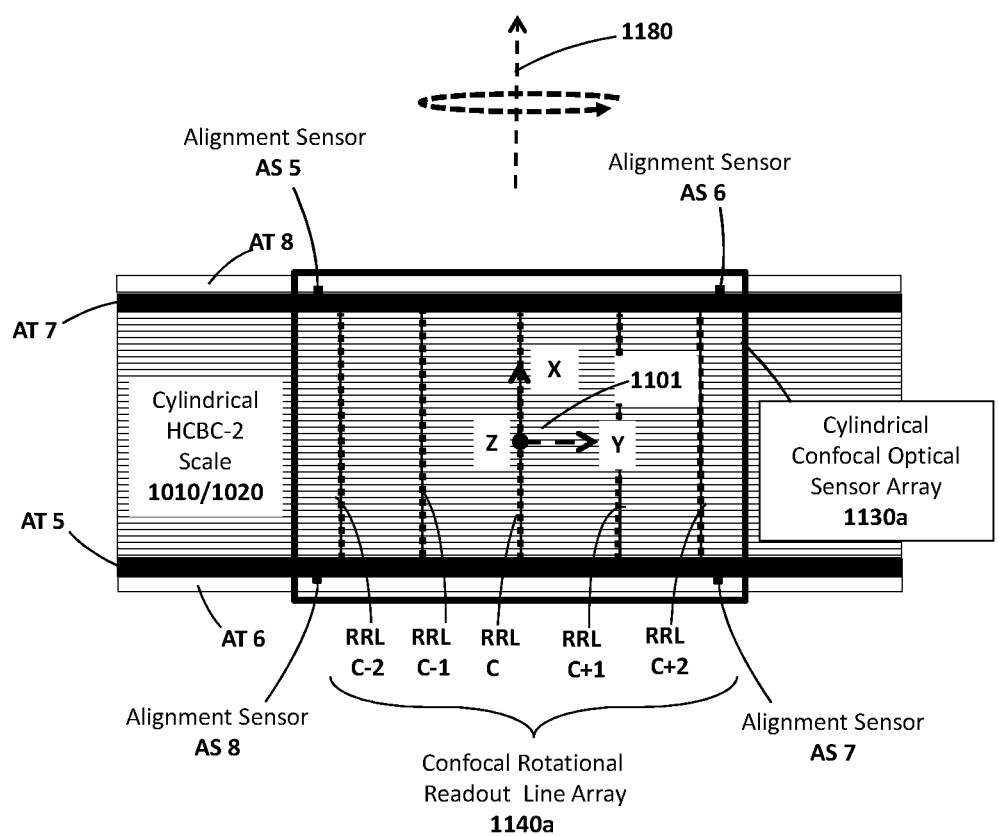
FIG. 11 is an XY view of a Cylindrical HCBC-2 Scale rotating about an axis parallel to the plane of the drawing and a Cylindrical Array of Confocal Optical Sensors comprising five example Rotational Readout Lines (RRLs), each containing a plurality of MCOSCs operating as position readouts and also showing two example rotated COSCs operating as alignment sensors, consistent with various embodiments of the present disclosure.

FIG. 11 is a 3D view in the Z axis direction of coordinate orientation indicator 1101 (i.e., looking down from above) at the curved surface of a Cylindrical HCBC-2 Scale 1010/1020 (the two reference numbers 1010 and 1020 representing inner and outer scale alternatives) through a Cylindrical Confocal Optical Sensor Array (CCOSA) 1130a. Line 1180 indicates the axis of scale rotation, parallel to the X axis of orientation indicator 1101.

For a rotational encoder, CCOSA 1130a may utilize a non-planar support structure. However, each individual COSC and MCOSC inside of the support structure may be the same as in the linear encoder design previously described. Confocal Rotational Readout Line Array (CR-RLA) 1140a is shown comprising five example Rotational Readout Lines RRL C−2, RRL C−1, RRL C, RRL C+1 and RRL C+2, where RRL C again denotes a central readout line. More or fewer readout lines may be used. Alignment tracks for the rotational encoder are also either on the inside or the outside of a cylindrical surface as opposed to a planar surface and therefore are referenced by new numbers AT 5, AT 6, AT 7 and AT 8. Alignment sensors for the rotational encoder may be individually the same as for the linear encoder, but have been given new names AS 5, AS 6, AS 7 and AS 8 in the drawing because of their cylindrical alignment. The individual X direction code track widths along the curved cylindrical surface may be the same as for the planar scale in order to maintain the same MCOSC design as for the linear encoder if desired.

FIG. 12 is a view in an YZ plane containing a cross-section view of five MCOSC's in example Cylindrical Confocal Optical Sensor Array (CCOSA) 1130a as shown in FIG. 11 when viewing in the X direction. The example five readout MCOSC's are arranged so that the optical axis of each MCOSC may be extended to intersect the axis of rotation of Cylindrical Multitrack Scale 1010/1020. Two rotated Alignment Sensor COSC's (AS 5 and AS 6) are shown to the left and right of the readout MCOSC's. Alignment Sensors AS 5 and AS 6 may be in a different YZ plane with respect to coordinate orientation indicator 1101, i.e., a plane with a different X coordinate as indicated in FIG. 11.

Environmental window 1225 is a portion of a transparent cylindrical shell. Also shown in FIG. 12 is the dashed outline of an arc sector with arc distance L (the position quantity measured by rotational encoder OARPE in FIG. 10), the radius R to the scale patterns, and the angle of rotation θ (which may be calculated as a final output parameter if desired using the relation θ=L/R). The COSC/MCOSC height H in this example system is 800 μm for all COSC's and MCOSC's, but any suitable height can be used. In the interest of clarity, radius R of scale 1010/1020 has been chosen to show an entire circular cross section in the drawing. The radius R is scaled with respect to the distance H, and in the example embodiment is about 2,000 μm (2 mm). Any suitable radius R can be used, and larger radius values may be expected to result in smaller values of arc angle θ than illustrated. Optional additional CCOSA's such as CCOSA 1130b, CCOSA 1130c and CCOSA 1130d may also be used, as shown in FIG. 12. Fewer or more readout MCOSC's than the five illustrated in CRRLA 1140a may also be used in any CRRLA.

FIG. 13 is a flow chart of example operations in a method for measuring the position of a planar or rotational (e.g., cylindrical) scale relative to a planar or a rotational readout assembly, consistent with various example embodiments described in the present disclosure. The method 1300 begins with optional block 1301, pursuant to which a planar or rotational (e.g., cylindrical) scale is attached to a first machine part or device for which linear or rotational position relative to a second machine part or device is desired. The method then proceeds to optional block 1302, pursuant to which a calibrated Linear Position Readout Assembly or Rotational Position Readout Assembly is attached to said second machine part or device.

The method then proceeds to block 1303, pursuant to which light pulses are emitted from the light sources of the Planar or Cylindrical Confocal Optical Sensor Arrays 130 or 1130*a*. To that end, a Controller (e.g., Controller 140 in FIG. 1 or Controller 140 in FIG. 10) may cause a series of light pulses to be emitted from all or a portion of the light sources (e.g., LED's or laser diodes) in the Planar or Rotary/Cylindrical Confocal Optical Sensor Arrays (COSA's) that are part of a Linear or Rotary/Cylindrical Encoder Optical Readout Assembly as illustrated in FIGS. 1-12. In embodiments the temporal pulse width of the light source emitters is kept short in order to "freeze" the relative motion between scales and readout heads. It may also be desirable to use a high pulse repetition frequency (PRF) in order to reduce or even minimize time delay and error in relative velocity estimations. Such estimations may be performed by dividing measured position difference by a known pulse repetition period, or by multiplying position difference by PRF. As discussed elsewhere, pulse width may be as short as 1-10 ns and PRF as high as 500 kHz to 1 MHz. Initial fine alignment of the Linear or Rotary/Cylindrical Encoder Optical Readout Assembly may require several pulse times to achieve acceptable alignment accuracy, during which time a warning flag may accompany position data reports.

The method may then proceed to block 1304, pursuant to which sensor signals produced by light reflected from an HCBC-2 scale are measured. In embodiments, such signals are measured when a portion of light reflected from either of the respective planar or rotary scales is captured by the light sensor (e.g., a photodiode) in each individual COSC (an example COSC configuration may be seen in FIG. 3), resulting in an electrical signal pulse with a measured signal magnitude. The method may then proceed to block 1305, pursuant to which a reference signal value is produced. In embodiments the reference signal value is produced by averaging all signal values from readout line sensors. The method may then proceed to block 1306, pursuant to which the sensor signals measured pursuant to block 1304 are normalized with the reference signal value. Because there are equal "white" and "black" reflecting areas in the HCBC-2 scale, the reference signal value may be a reliable 50% reference level for use in digitizing each signal into a one or a zero, and also used in extrapolation calculations to improve the accuracy of measurement. Because of the relatively large area that is illuminated and measured (e.g., 7 mm width by 10-20 mm length) and the redundant nature of the HCBC-2, the effect of small areas of dirt or grease on either measurement scale is expected to be negligible.

The method then may proceed to block 1307, pursuant to which an alignment process is performed. In embodiments, the alignment process includes using certain groups of the measured signals to create error signals for the purpose of initiating fine alignment of the at least one COSA with respect to its respective HCBC-2 multitrack scale. In particular, the magnitudes of signals measured from sub-regions (e.g., each of four quadrants) of unweighted numbering system major regions UWNS and UWNS RC (reference FIG. 6) may be used to estimate the magnitudes of focus error for the sub-regions. Any suitable method of automatic focus measurement may be used, such as measured contrast variation during a "dithered" Z coordinate scan.

Now considering pitch and roll angular alignment, a comparison of the sign and magnitude of estimated defocus of a left pair of Unweighted Numbering System (UNWS) quadrants (e.g., as in FIG. 6) with that of the right pair of quadrants may provide direction and magnitude of any pitch angle error, whereas comparison of the sign and magnitude of estimated defocus of an upper pair of UNWS quadrants (e.g., as in FIG. 6) with that of the lower pair of quadrants may provide direction and magnitude of any roll angle error. After reduction of Z, roll and pitch alignment errors as discussed above, signal magnitudes from at least four dedicated AS units in a COSA (e.g., as in FIGS. 2 and 11) may be used to create sign and magnitude error signals for automatic fine yaw alignment of readout assemblies 130 and/or 1140*a*.

The method may then proceed to decision block 1308, pursuant to which a determination is made as to whether the alignment is acceptable. In embodiments, the decision involves comparing pitch, roll, yaw and average focus errors to a set of pre-determined tolerance values, with alignment being acceptable if the errors are below the pre-determined tolerance, and unacceptable if the errors are above the predetermined tolerance. If the result is "No" the method calls for a continuation of the alignment process, with no position data reported. But if the result is "Yes" in block 1308, the method may proceed to block 1309, pursuant to which linear or rotational position values for the last received pulse of optical energy are calculated in Controllers 140 or 1040.

The method then proceeds to block 1310, pursuant to which a position is reported. In embodiments, controllers 140 or 1040 report the measured position value to the system user via Operator and Machine Interface 145 or 1045. The method then proceeds to block 1311, pursuant to which a decision is made as to whether operations should continue or not. If "Yes", the method loops back to block 1303 and repeats, but if "No", the method proceeds to block 1312 and ends.

FIG. 14 is a table of example encoding parameters for one example of a planar HCBC-2 scale absolute position linear encoder. The table as shown is pre-calculated for a chosen specific value of 100 nm for stripel width Qs as seen in dashed block 1401 of the first numerical row. It includes six available values of "Total Number of Encoded Stripels Ns" in the second numerical row, including the example 8,388,608 in dashed block 1402. It may be noticed that each of the example entries in the second numerical row represents a unique power of two, such that each entry has a value twice that of the previous entry and half of that of the following entry, a requirement of both HCBC and HCBC-2 codes. For example, the selected value 8,388,608 in dashed line box 1402 may be written as two to the 23'rd power, i.e., $2^{23}$, and the value 16,777,216 in the next column may be written as two to the 24'th power, i.e., $2^{24}$.

To use the table, a user first chooses one of the six values of "Total number of encoded stripels Ns" in the second numerical row, such as 8,388,608 in dashed line box 1402, consistent with the example system design of the present disclosure. Remaining in the same column as for box 1402 the user may next read the pre-calculated "Encoded Scale Length (mm)" of 838.861 mm in box 1403, found in the third numerical row. If a larger or shorter "Encoded Scale Length" is desired, a user may select a different value of "Total Number of Encoded Stripels Ns" in the second numerical row to obtain a new value of "Encoded Scale Length". It may be seen that doing so also defines the proper column out of six possibilities for finally determining "Total No. of code tracks $p_{max}$".

To determine the "Total No. of code tracks $p_{max}$", the user now chooses one of the six pre-entered values of "Minimum square wave period $\Lambda_{MIN}$ in stripels" in the first column. A chosen value of 32 is shown in dashed line box 1404, consistent with the example system design of the present disclosure. This selection defines a row which contains six possible values of the Total No. of code tracks $p_{max}$, and one value in the right-hand column of the "Total no. of unweighted tracks". For the selected example of $\Lambda_{MIN}=32$, the common value of Total No. of Unweighted Tracks is 30 as seen in box 1405, in the same row. The value for "Total No. of Code Tracks $p_{max}$" may now be found in the table entry having the same row as for "Minimum square wave period $\Lambda_{MIN}$" and having the same column as for the selected "Total Number of Encoded Stripels Ns. For the example selection of Ns=8,388,608, it can be seen in box 1406 that a total of 68 HCBC-2 tracks are required, consistent with the example system design of the present disclosure. New tables may be constructed for choices of Qs other than 100 nm by using methods provided in the '238 application.

FIG. 15 is a table of example encoding parameters for one example of a cylindrical scale HCBC-2 rotary multitrack absolute position encoder consistent with the present disclosure. The table of FIG. 15 may be used in a similar manner to that described with respect to FIG. 14. The box 1501 entry relative to the first numerical row name "Stripel Arc Length in nanometers" in this case is again 100 nm (for the sake of example), but is in reference to an arc length on a cylindrical surface such as illustrated in FIG. 12 instead of on a planar surface. The box 1502 entry of 131,072 for "Total Number Ns of Encoded Stripels per Revolution" was chosen to make the Encoded Scale Diameter (mm) for 100 nm stripel arc length in box 1504 compatible with the drawing physical size and scale of FIG. 12, but any of the six available entries in the 1502 row may be chosen. The entry of 13.1072 mm in box 1503 for "Encoded Scale Circumference" is directly analogous to the previously discussed entry of 838.861 mm "Encoded Scale Length" in box 1403 of FIG. 14. Returning to box 1504 of FIG. 15, it may be seen that the scale diameter for the chosen example is only 4.17 mm. However, parameters for encoders with five larger scale diameters (up to 133.5 mm) are also documented in FIG. 15. It should be noted that a requirement for a specific diameter of the rotary encoder may be met by a combination of different multiples of two for the total number of stripels per revolution and an optimized stripel arc length.

FIG. 15 shows an example selection of a 32 stripel period for $\Lambda_{MIN}$ (box 1506) and 30 unweighted numbering system tracks in box 1507. Box 1508 in the same row as boxes 1506 and 1507 indicates that a total of 56 code tracks would be used (in this example) to encode the 4.17 mm diameter example cylindrical scale with stripel arc length 100 nm. The table in FIG. 15 also includes a row of pre-calculated Angular Stripel Arc Lengths in microradians (µrad) for the constant 100 nm stripel arc length that is consistent with the example system design in the present disclosure. Box 1505 shows a value of 47.9 µrad for the 4.17 mm diameter example encoder and a value of 1.498 µrad for a 133.5 mm diameter encoder. Since the extrapolation and multiple readout line averaging methods of measuring to small fractions of one stripel that have been discussed for linear encoders herein also apply to rotary encoders, achievable angular accuracy may be one or perhaps two orders of magnitude better than the stripel values shown in the FIG. 15 table, i.e., in the nanoradian range for encoder diameters of 100 mm or greater.

The following examples represent additional non-limiting embodiments consistent with the present disclosure.

EXAMPLES

Example 1

According to this example there is provided an optical absolute position encoder, including: a scale including a substrate including a first region encoded with a hybrid cyclic binary code 2 (HCBC-2); and an optical readout assembly (ORA); wherein: the first region encoded with the HCBC-2 includes: a first sub-region including a first multitrack array of hybrid cyclic binary code (HCBC) patterns; a second sub-region including a second multitrack array of HCBC patterns, the second multitrack array being a reflection and complement of the first multitrack array; the ORA includes at least one light source configured to emit light pulses onto the HCBC-2 encoded scale; and the ORA is configured to measure at least a portion of light reflected by the HCBC-2 scale and determine a position of the HCBC-2 scale relative to the ORA.

Example 2

This example includes any or all of the features of example 1, wherein: the scale includes a first inner region including the first sub-region and a second inner region including the second sub-region; each track of the first multitrack array is an encoded strip that is longer in a measurement direction than in a non-measurement direction.

Example 3

This example includes any or all of the features of example 2, wherein: the scale further includes a first outer region and a second outer region; and the first outer region, the second outer region, or both the first and the second outer regions comprise at least one unencoded alignment track.

Example 4

This example includes any or all of the features of example 3, wherein the first region is disposed between the first outer region and the second outer region.

Example 5

This example includes any or all of the features of example 4, wherein the first and the second outer regions each comprise an unencoded alignment track.

Example 6

This example includes any or all of the features of example 4, wherein: the at least one alignment track includes a first alignment track pair and a second alignment track pair; the first outer region includes the first alignment track pair; the second outer region includes the second alignment track pair; each of the first and second alignment track pairs comprise a first track and a second track adjacent the first track, wherein the first track is non-reflective or non-transmissive over an entire length of the scale; and the second track is reflective or transmissive over the entire length of the scale.

Example 7

This example includes any or all of the features of any one of examples 3 to 6, wherein the ORA includes an optical sensor array, the optical sensor array including: an array of light sources; and an array of light sensors.

Example 8

This example includes any or all of the features of example 7, wherein the array of light sensors includes a plurality of confocal optical sensors.

Example 9

This example includes any or all of the features of example 7, wherein: the optical sensor array includes a readout line assembly including at least one readout line; the at least one readout line includes a plurality of readout light sources and a plurality of readout line optical sensors; the array of light sources includes the plurality of readout light sources; and the array of light sensors includes the plurality of the readout line optical sensors.

Example 10

This example includes any or all of the features of example 9, wherein the optical sensor array further includes a plurality of alignment sensors.

Example 11

This example includes any or all of the features of example 9, wherein: the plurality of readout line optical sensors are configured to measure linear position errors most accurately in a first direction; the plurality of alignment sensors are configured to measure an alignment position in a second direction most accurately; and the first direction and the second direction differ from one another.

Example 12

This example includes any or all of the features of any one of examples 1 to 11, wherein: the optical absolute position encoder is a linear optical absolute position encoder; and the scale is a planar, wherein the first and second multitrack arrays are arranged on or are formed within the substrate in a planar two-dimensional layout.

Example 13

This example includes any or all of the features of any one of examples 1 to 11, wherein: the optical absolute position encoder is a rotary optical absolute position encoder; the scale is a rotary scale; and the substrate is or is disposed on an inside or outside surface of a cylindrical drum.

Example 14

According to this example there is provided a method of measuring the absolute position of a scale relative to a readout assembly, including: emitting light pulses from a light source, the light pulse being incident on a scale, the scale including a first region encoded with a hybrid binary cyclic code 2 (HCBC-2); detecting, with an optical readout assembly (ORA) at least a portion of the light pulses reflected by the scale, and generating at least one sensor signal; and calculating, with a controller, a position of the scale relative to the readout assembly, based on the at least one sensor signal; wherein: the first region encoded with the HCBC-2 scale includes: a first sub-region including a first multitrack array of hybrid cyclic binary code (HCBC) patterns; and a second sub-region including a second multitrack array of HCBC patterns, the second multitrack array being a reflection and complement of the first multitrack array.

Example 15

This example includes any or all of the features of example 14, wherein: the scale includes a first inner region including the first sub-region and a second inner region including the second sub-region; each track of the first multitrack array is an encoded strip that is longer in a measurement direction than in a non-measurement direction.

Example 16

This example includes any or all of the features of example 15, wherein: the scale further includes a first outer region and a second outer region; and the first outer region, the second outer region, or both the first and the second outer regions comprise at least one unencoded alignment track.

Example 17

This example includes any or all of the features of example 16, wherein the first and the second outer regions each comprise an unencoded alignment track.

Example 18

This example includes any or all of the features of example 16 or 17, wherein the ORA includes an optical sensor array, the optical sensor array including: an array of light sources configured to emit the light pulses; and an array of light sensors configured to detect light reflected by the scale.

Example 19

This example includes any or all of the features of example 18, wherein the array of light sensors includes a plurality of confocal optical sensors.

Example 20

This example includes any or all of the features of example 18, wherein: the optical sensor array includes a readout line assembly including at least one readout line; the at least one readout line includes a plurality of readout light sources and a plurality of readout line optical sensors; the array of light sources includes the plurality of readout light sources; and the array of light sensors includes the plurality of the readout line optical sensors.

Example 21

This example includes any or all of the features of example 14, wherein the at least one sensor signal includes a plurality of sensor signals, and the method further includes: measuring the plurality of sensor signals; generating a reference signal value from the plurality of sensor signals; and normalizing each of the plurality of sensor signals with the reference signal value to generate a plurality of normalized sensor signals; and wherein calculating the position of the scale relative to the readout assembly is performed based on the plurality of normalized sensor signals.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical absolute position encoder, comprising:
   a scale comprising a substrate comprising a first region encoded with a hybrid cyclic binary code 2 (HCBC-2); and
   an optical readout assembly (ORA);
   wherein:
   said first region encoded with said HCBC-2 comprises:
   a first sub-region comprising a first multitrack array of hybrid cyclic binary code (HCBC) patterns;
   a second sub-region comprising a second multitrack array of HCBC patterns, the second multitrack array being a reflection and complement of the first multitrack array;
   the ORA comprises at least one light source configured to emit light pulses onto said HCBC-2 encoded scale; and
   said ORA is configured to measure at least a portion of light reflected by said HCBC-2 scale and determine a position of said HCBC-2 scale relative to said ORA.

2. The optical absolute position encoder of claim 1, wherein:
   said scale comprises a first inner region comprising said first sub-region and a second inner region comprising said second sub-region;
   each track of the first multitrack array is an encoded strip that is longer in a measurement direction than in a non-measurement direction.

3. The optical absolute position encoder of claim 2, wherein:
   said scale further comprises a first outer region and a second outer region; and
   said first outer region, said second outer region, or both said first and said second outer regions comprise at least one unencoded alignment track.

4. The optical absolute position encoder of claim 3, wherein said first region is disposed between the first outer region and the second outer region.

5. The absolute optical position encoder of claim 4, wherein said first and said second outer regions each comprise an unencoded alignment track.

6. The absolute optical position encoder of claim 4, wherein:
   the at least one alignment track comprises a first alignment track pair and a second alignment track pair;
   the first outer region comprises the first alignment track pair;
   the second outer region comprises the second alignment track pair;
   each of the first and second alignment track pairs comprise a first track and a second track adjacent the first track, wherein the first track is non-reflective or non-transmissive over an entire length of the scale; and the second track is reflective or transmissive over the entire length of the scale.

7. The absolute optical position encoder of claim 3, wherein the ORA comprises an optical sensor array, the optical sensor array comprising:
   an array of light sources; and
   an array of light sensors.

8. The absolute optical position encoder of claim 7, wherein the array of light sensors comprises a plurality of confocal optical sensors.

9. The absolute optical position encoder of claim 7, wherein:
   the optical sensor array comprises a readout line assembly comprising at least one readout line;
   the at least one readout line comprises a plurality of readout light sources and a plurality of readout line optical sensors;
   said array of light sources comprises said plurality of readout light sources; and
   said array of light sensors comprises said plurality of said readout line optical sensors.

10. The absolute optical position encoder of claim 9, wherein the optical sensor array further comprises a plurality of alignment sensors.

11. The absolute optical position encoder of claim 9, wherein:
    said plurality of readout line optical sensors are configured to measure linear position errors most accurately in a first direction;
    said plurality of alignment sensors are configured to measure an alignment position in a second direction most accurately; and
    the first direction and the second direction differ from one another.

12. The optical absolute position encoder of claim 1, wherein:
    the optical absolute position encoder is a linear optical absolute position encoder; and
    said scale is a planar, wherein the first and second multitrack arrays are arranged on or are formed within the substrate in a planar two-dimensional layout.

13. The optical absolute position encoder of claim 1, wherein:
    the optical absolute position encoder is a rotary optical absolute position encoder;
    said scale is a rotary scale; and
    said substrate is or is disposed on an inside or outside surface of a cylindrical drum.

14. A method of measuring the absolute position of a scale relative to a readout assembly, comprising:
    emitting light pulses from a light source, said light pulse being incident on a scale, the scale comprising a first region encoded with a hybrid binary cyclic code 2 (HCBC-2);
    detecting, with an optical readout assembly (ORA) at least a portion of said light pulses reflected by said scale, and generating at least one sensor signal; and
    calculating, with a controller, a position of the scale relative to said readout assembly, based on said at least one sensor signal;
    wherein:
    the first region encoded with said HCBC-2 scale comprises:
    a first sub-region comprising a first multitrack array of hybrid cyclic binary code (HCBC) patterns; and
    a second sub-region comprising a second multitrack array of HCBC patterns, the second multitrack array being a reflection and complement of the first multitrack array.

15. The method of claim 14, wherein:
    said scale comprises a first inner region comprising said first sub-region and a second inner region comprising said second sub-region;

each track of the first multitrack array is an encoded strip that is longer in a measurement direction than in a non-measurement direction.

16. The method of claim 15, wherein:

said scale further comprises a first outer region and a second outer region; and said first outer region, said second outer region, or both said first and said second outer regions comprise at least one unencoded alignment track.

17. The method of claim 16, wherein said first and said second outer regions each comprise an unencoded alignment track.

18. The method of claim 16, wherein the ORA comprises an optical sensor array, the optical sensor array comprising:

an array of light sources configured to emit said light pulses; and an array of light sensors configured to detect light reflected by said scale.

19. The method of claim 18, wherein the array of light sensors comprises a plurality of confocal optical sensors.

20. The method of claim 18, wherein:

the optical sensor array comprises a readout line assembly comprising at least one readout line;

the at least one readout line comprises a plurality of readout light sources and a plurality of readout line optical sensors;

said array of light sources comprises said plurality of readout light sources; and said array of light sensors comprises said plurality of said readout line optical sensors.

21. The method of claim 14, wherein said at least one sensor signal comprises a plurality of sensor signals, and the method further comprises:

measuring said plurality of sensor signals;

generating a reference signal value from said plurality of sensor signals; and normalizing each of the plurality of sensor signals with the reference signal value to generate a plurality of normalized sensor signals; and wherein calculating said position of the scale relative to said readout assembly is performed based on said plurality of normalized sensor signals.

* * * * *

UNITED STATES PATENT AND TRADEMARK OFFICE
CERTIFICATE OF CORRECTION

PATENT NO. : 10,502,593 B1
APPLICATION NO. : 16/433427
DATED : December 10, 2019
INVENTOR(S) : Philip M. Johnson et al.

It is certified that error appears in the above-identified patent and that said Letters Patent is hereby corrected as shown below:

In the Claims

In Column 19, Line 46, in Claim 5, delete "absolute optical" and insert -- optical absolute --, therefore.

In Column 19, Line 49, in Claim 6, delete "absolute optical" and insert -- optical absolute --, therefore.

In Column 19, Line 63, in Claim 7, delete "absolute optical" and insert -- optical absolute --, therefore.

In Column 20, Line 1, in Claim 8, delete "absolute optical" and insert -- optical absolute --, therefore.

In Column 20, Line 4, in Claim 9, delete "absolute optical" and insert -- optical absolute --, therefore.

In Column 20, Line 16, in Claim 10, delete "absolute optical" and insert -- optical absolute --, therefore.

In Column 20, Line 19, in Claim 11, delete "absolute optical" and insert -- optical absolute --, therefore.

Signed and Sealed this
Eighteenth Day of February, 2020

Andrei Iancu
*Director of the United States Patent and Trademark Office*